2 Sheets—Sheet 1.

T. C. HISTED.
Grain-Separator.

No. 218,971. Patented Aug. 26, 1879.

WITNESSES:
Chas Niola
C. Sedgwick

INVENTOR:
T. C. Histed
BY Munn & Co
ATTORNEYS.

N. PETERS, PHOTO-LITHOGRAPHER, WASHINGTON, D. C.

2 Sheets—Sheet 2.

T. C. HISTED.
Grain-Separator.

No. 218,971. Patented Aug. 26, 1879.

WITNESSES:
Chas. Niola.
C. Sedgwick.

INVENTOR:
T. C. Histed
BY Munn & Co.
ATTORNEYS.

UNITED STATES PATENT OFFICE.

THADDEUS C. HISTED, OF JUNCTION CITY, KANSAS, ASSIGNOR TO MARGARET E. HISTED AND ANSON W. CALLEN, OF SAME PLACE.

IMPROVEMENT IN GRAIN-SEPARATORS.

Specification forming part of Letters Patent No. 218,971, dated August 26, 1879; application filed November 19, 1878.

*To all whom it may concern:*

Be it known that I, THADDEUS CONSTANTINE HISTED, of Junction City, in the county of Davis and State of Kansas, have invented a new and useful Improvement in Grain-Separators, of which the following is a specification.

Figure 1:
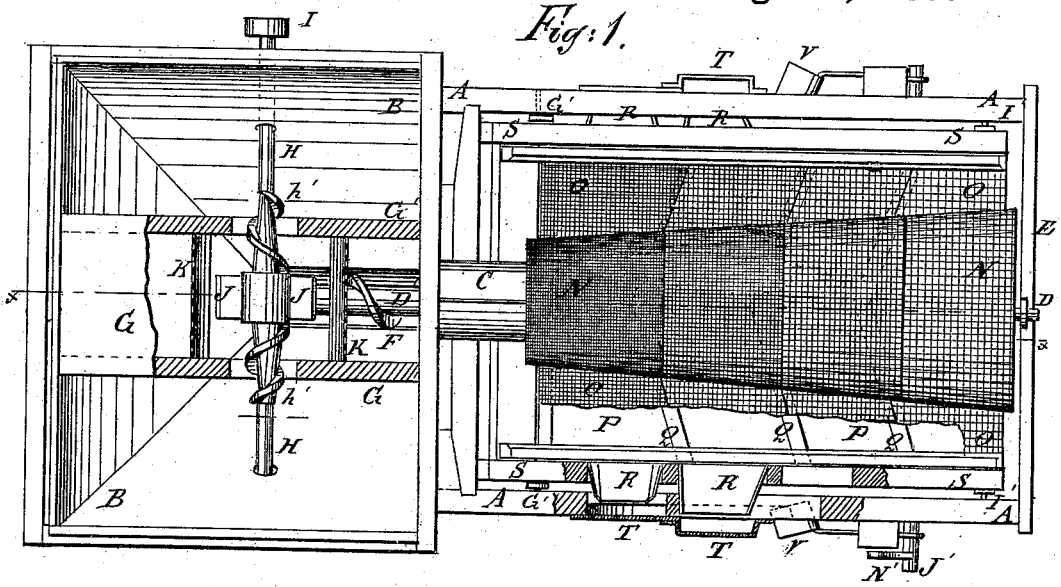
Figure 2:
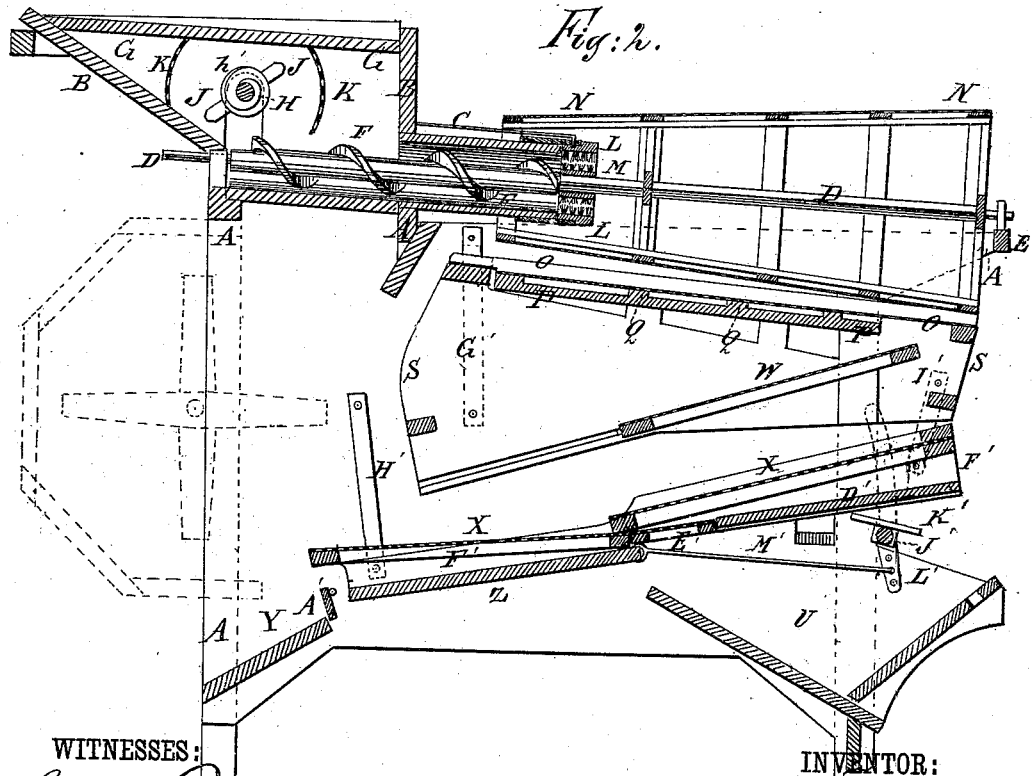
Figure 3:
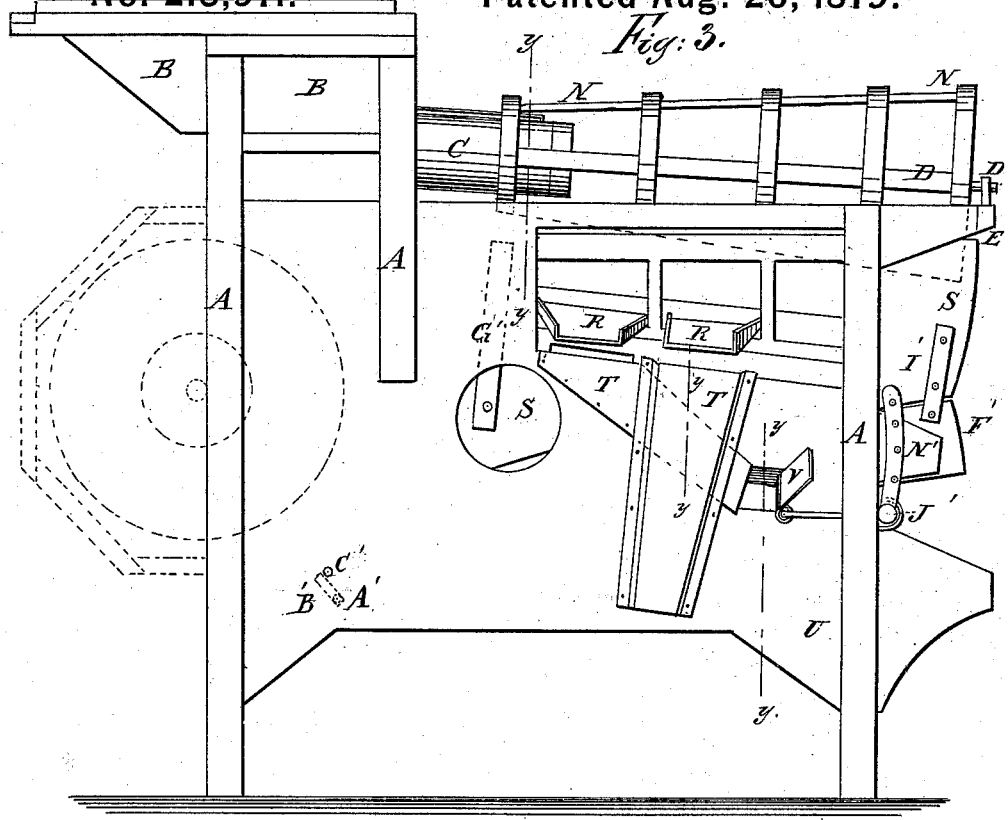
Figure 4:
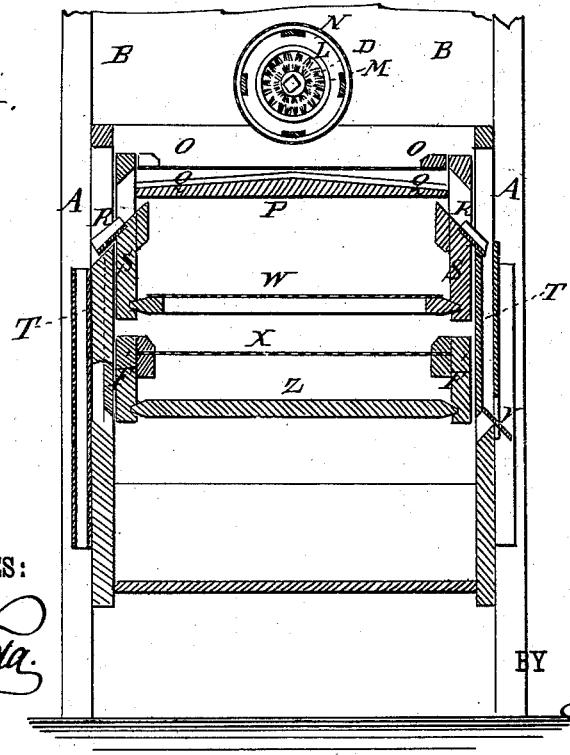

Figure 1, Sheet 1, is a top view of my improved machine, parts being broken away to show the construction. Fig. 2, Sheet 1, is a vertical longitudinal section of the same, taken through the line $x$ $x$, Fig. 1. Fig. 3, Sheet 2, is a side view of the same. Fig. 4, Sheet 2, is a detail cross-section of the same, taken through the broken lines $y$ $y$ $y$ $y$ $y$, Fig. 3.

Similar letters of reference indicate corresponding parts.

The object of this invention is to improve the construction of the grain-separator for which Letters Patent No. 199,204 were granted to me January 15, 1878, so as to make it more effective in operation.

A represents the frame of the machine, in the lower forward part of which is placed a fan and fan-drum in the usual way.

To the top of the forward part of the frame A is attached a hopper, B, to receive the grain to be cleaned and separated.

In an opening in the lower part of the inner side of the hopper B is secured a tubular conveyer-spout, C, the lower part of which coincides with and forms a continuation of the concavity in the bottom of the said hopper B.

D is a shaft which passes through the lower part of the hopper B and through the spout C, and its rear end revolves in bearings in a cross-bar, E, attached to the rear end of the frame A adjustably, so that the inclination of the said shaft D may be changed as may be required.

The forward end of the shaft D revolves in bearings in the forward side of the hopper B, and is connected with and driven from the fan-shaft by suitable gearing. The part of the shaft D that passes through the hopper B and the spout C has a spiral thread or flange, F, formed upon or attached to it, to convey the grain from the hopper B, through the spout C, to the screens.

In the lower part of the hopper B is secured a box, G, covering the part of the conveyer-screw D F that is within the said hopper, and having holes or openings in its sides, through which the grain passes to the said conveyer-screw D F, and through which passes a shaft, H. The shaft H revolves in bearings in the sides of the hopper B, and to one of its ends is attached a small pulley, I, to receive a belt which is designed to pass around a larger pulley attached to the fan-shaft, so that the said shaft H may be driven very rapidly.

Upon the shaft H, upon the opposite sides of its center, are formed right and left screw-threads $h'$, as shown in Fig. 1, to feed the grain into the box G.

To the center of the shaft H are attached two or more paddles or beaters, J, to push the grain in the direction of the conveyer-screw D F.

In the box G, in front and rear of the shaft H, are attached curved and perforated guide-plates K, to receive the grain thrown upward by the paddles or beaters J, and guide it downward to the conveyer-screw D F. The paddles or beaters J also knock off and break up any smut that may be upon the grain.

To the rear end of the spout C is detachably attached a ring, L, having a brush formed upon its inner surface; and to the shaft D, within the ring-brush L, is attached a ring, M, having a brush formed upon its outer surface.

As the grain is conveyed through the spout C, it passes between the two brushes L M, by the action of which all smut and dust are removed from the kernels, so that they will be blown away by the blast from the fan-blower.

To the rear part of the shaft D is attached a slightly-flaring cylindrical screen, N, the smaller forward end of which receives the rear end of the spout C, so that all the grain from the said spout may pass into the said screen N.

The screen N is divided into four (more or less) ring-sections by hoops, and each section is covered with wire-cloth of a different fineness of mesh, the finest cloth being placed next the spout C.

From the rotary screen N the different seeds and grains are separated, and fall upon and pass through the screen O, the wire-cloth of which is correspondingly graded to the bottom board P, placed beneath and attached to the frame of the said screen O. The board P is made shorter than the screen O, so as to leave the rear end of the said screen O uncovered, and allow the grain, &c., that passes through the said part to fall upon the lower screens. The board P has cleats Q attached to it beneath the divisions of the screen-cloth of the screen Q, and extending with a rearward inclination from its center line to its side edges.

In the side frame and in the lower parts of the side bars of the screen O are formed notches to allow the grass-seed, chess, cockle-seed, clover-seed, rye, oats, &c., separated from the wheat to pass out through the spouts R, secured in openings in the sides of the upper shoe, S, into the spouts T, secured to the side casings of the machine, and from which they escape into suitable receivers.

The forward spout T passes back beneath the second spout T, and at its end is formed a hole leading into the chess-box U, which opening is provided with a hinged cut-off spout, V, so that the seed from the said forward spout T may be directed into the chess-box U, or into an outside receiver, by adjusting the said hinged spout V. Each side of the machine is provided with this arrangement of spouts.

From the open rear end of the screen O the grain falls upon the cut-off screen W, which slides in grooves in the sides of the lower part of the upper shoe, S. The grain that cannot pass through the screen W falls from its lower end upon the lower screen X. The part of the grain that cannot pass through the screen X falls from its lower end into and passes out through the spout Y, forming the first grade. The part of the grain that passes through the screen X falls upon the board Z, and passes from its lower end into a receiver placed beneath the mill, forming the second grade.

The opening at the lower end of the board Z is provided with a narrow hinged board, A', which may be lowered to close the said opening, and cause the second grade to pass out with the first grade.

The hinged board or valve A' is adjusted by a cord, B', attached to it, which passes out through a hole in the side casing of the machine, and is secured in place by a pin, C', inserted in the said hole.

The part of the grain that passes through the screen W falls upon the upper screen X, through which the small kernels and the other or impure seeds pass. The part of the grain that cannot pass through the upper screen X falls from its lower end upon the lower screen X, where it is divided into first and second grades, as hereinbefore described.

The part of the grain, the chess, &c., that passes through the upper screen X falls upon the chess-board D', and passes from its lower end to the narrow screen E', placed in the lower part of the chess-board grooves, where it is separated, the grain passing to the board Z, and passing out as second grade, and the chess, &c., passing through the said screen E' into the chess-box U. The screens X X E' and the boards Z D' are attached to the lower shoe, F'.

The forward end of the upper shoe, S, is supported by the straps G', the lower ends of which are attached to the opposite sides of the said end of the shoe, and the upper ends of which are attached to the frame or casing of the machine.

The forward end of the lower shoe, F', is supported by straps H', the lower ends of which are attached to the opposite sides of the said end of the shoe F', and the upper ends of which are attached to the casing or frame of the machine.

The rear end of the upper shoe, S, rests upon the rear end of the lower shoe, F', and the two rear ends are connected together by the straps I', attached to their outer sides.

The rear end of the lower shoe, F', rests upon the cross-bar J', pivoted to the frame A, and which is made flat, or has cross-arms K', attached to it for the said shoe F' to rest upon, so that both shoes may receive an up-and-down movement from the rocking of the said cross-bar J'.

To the rock-bar J' are attached two downwardly-projecting arms L', to the lower ends of which are attached the rear ends of two rods, M'. The forward ends of the rods M' are attached to the forward part of the lower shoe, F'. With this construction the two shoes S F' will receive an end or longitudinal movement at the same time that they receive an up-and-down movement.

To the end of the rock-bar J' is attached an upwardly-projecting arm, N', which is connected with a cam or crank on the fan-shaft, in the usual way, so that the said bar may be rocked by the revolution of the said fan-shaft.

The two screens X are pivoted at the outer ends of their side bars to the lower shoe, F', and are made of such a length that their inner ends may overlap each other, and may be adjusted with the inner end of the rear screen X above or below the inner end of the forward screen X, as may be desired.

To adjust the machine for cleaning and grading oats, the inner end of the forward screen X is adjusted above the inner end of the rear screen X, the cut-off screen W is pushed down, the revolving screen N and the graduated screen O P are removed, the oats-screen is inserted in the upper groove of the upper shoe, S, and the hinged board or valve A' is raised. With this arrangement the heavy oats drop directly to the cut-off screen W, pass thence to the forward screen X, and pass out as first grade. The lighter oats are blown over the rear end of the cut-off screen W, are separated from chess and other foreign seeds by the chess-screen X, and pass out as second grade.

Having thus described my invention, I claim as new and desire to secure by Letters Patent—

1. The two chess-screens X X, pivoted near their outer ends to the lower shoe, F', and having their inner or free ends overlapped, substantially as herein shown and described.

2. The removable cut-off screen, combined with the pivoted lower-shoe screens, having their free adjacent ends overlapping, as and for the purpose specified.

3. The combination of the two ring-brushes L M with the conveyer-spout C and the conveyer-shaft D, substantially as herein shown and described.

4. The combination of the box G, the shaft H, provided with the spiral threads or flange $h'$, and the paddles or beaters J with the hopper B, the conveyer-spout C, and the conveyer-screw D F, substantially as herein shown and described.

THADDEUS CONSTANTINE HISTED.

Witnesses:
   JOHN K. WRIGHT,
   P. V. TROVINGER.